(12) United States Patent
Komorita (10) Patent No.: US 9,169,628 B2
(45) Date of Patent: Oct. 27, 2015

(54) APPARATUS FOR PREVENTING OVERFLOWS

(71) Applicant: Paul A Komorita, Houston, TX (US)

(72) Inventor: Paul A Komorita, Houston, TX (US)

(*) Notice: Subject to any disclaimer, the term of this patent is extended or adjusted under 35 U.S.C. 154(b) by 288 days.

(21) Appl. No.: 13/871,378

(22) Filed: Apr. 26, 2013

(65) Prior Publication Data

US 2014/0317838 A1    Oct. 30, 2014

(51) Int. Cl.
*E03D 11/00* (2006.01)

(52) U.S. Cl.
CPC .................................... *E03D 11/00* (2013.01)

(58) Field of Classification Search
CPC ........................................................ E03D 11/00
USPC .............................. 4/341, 340, 342, 427, 420
See application file for complete search history.

(56) References Cited

U.S. PATENT DOCUMENTS

| 4,204,285 | A * | 5/1980 | Pak ..................................... 4/427 |
| 5,019,346 | A * | 5/1991 | Richter et al. .................. 422/28 |
| 6,618,865 | B1 * | 9/2003 | Kim ............................... 4/420.4 |
| 6,944,892 | B1 * | 9/2005 | Giolas .............................. 4/427 |
| 2005/0138721 | A1 * | 6/2005 | Bowman et al. .................. 4/234 |
| 2008/0276362 | A1 * | 11/2008 | O'Malley et al. ................. 4/420 |

* cited by examiner

*Primary Examiner* — Janie Christiansen
(74) *Attorney, Agent, or Firm* — James A. Italia; Italia IP (57) ABSTRACT

An apparatus for controlling overflows is provided. The apparatus for controlling overflows may comprise an interior bowl including a waste receptacle and one or more water outlets connected to a water tank. The one or more water outlets may be configured to flush the interior bowl through a primary drain. Additionally, the apparatus for controlling overflows may include an exterior bowl, which may surround the interior bowl. The exterior bowl and the interior bowl may be separated by a gap. The gap may be configured to capture overflow water from the interior bowl when the primary drain malfunctions. Once the overflow water is captured by the gap, it may then be emptied into one or more containers configured to collect the overflow water.

12 Claims, 7 Drawing Sheets

APPARATUS FOR PREVENTING OVERFLOWS

TECHNICAL FIELD

This disclosure generally relates to a general art of water closets designed to capture overflows in case of toilet spillage and, more specifically, to an apparatus for controlling overflows.

BACKGROUND

During toilet use, overflows occur underneath a standard toilet seat and lid. For instance, when a toilet is clogged or too full, it may overflow onto a floor of a bathroom when flushed. This may create a mess, a slippery hazard, and unpleasant residual odors. If the mess is not cleaned quickly and thoroughly, it may begin to damage the floor of the bathroom. Furthermore, it may seep under a door or through the floor, cause damage to floors and ceilings of other areas, and create an unsanitary condition, which is a burden to clean up.

Existing solutions to include various toilet systems and designs, which are cumbersome to manufacture and use. Furthermore, they are costly, specialized, and therefore are unlikely to be widely used. Consequently, there is a need for a convenient, cost effective, and easy-to-use apparatus which would catch excess water that flows out of a toilet bowl and prevent the water from creating a slippery floor or other types of mess and damage; wherein manufacturing processes, materials, and water flow mechanics would be similar to those of conventional toilets requiring only the shape of the toilet bowl to be changed.

BRIEF DESCRIPTION OF THE DISCLOSURE

According to one or more example embodiments of the disclosure, there is provided an apparatus for controlling overflows. The apparatus for controlling overflows may include an interior bowl comprising a waste receptacle and water outlets connected to a water tank. The water outlets may be configured to flush the interior bowl through a primary drain. The water outlets may also be configured to prevent clogs by breaking up solid waste and toilet paper with a jet-like water action. The apparatus for controlling overflows may also include an exterior bowl, which may surround the interior bowl. The exterior bowl and the interior bowl may be separated by a gap. The gap may be configured to receive overflow water. After getting into the gap, the overflow water may be emptied into one or more containers configured to collect the overflow water. The one or more containers may have secondary slats configured to fit around primary slats of the exterior bowl.

According to various example embodiments, the apparatus for controlling overflows may also comprise a closing member including a seat and a lid. The closing member may have barrier ridges, which may be disposed underneath and around an outer perimeter of the closing member. Due to the barrier ridges, the closing member may provide additional overspill protection. This closing member may also be used for conventional toilets. In another case, the barrier ridges of the closing members may be disposed in a primary front area and a primary back area of the seat and lid. This closing member design may require the configuration of the one or more containers configured with gap openings along their upper sides only. The overflows occurring on the sides of the closing member may spill into their corresponding containers instead of spilling on the floor. This way, the closing member may direct the overflow water and waste into one or more containers having gap openings at their tops and an outer wall to accept the overflow water from a conventional toilet bowl. In certain embodiments, the gap openings may be provided at the top, outer, and the front walls of one or more containers.

Additional components, features, and aspects are realized through various embodiments of the disclosure. Other embodiments and aspects of the disclosure are described in detail below and are considered a part of the claimed disclosure. Other embodiments and aspects can be understood with reference to the description and the drawings.

BRIEF DESCRIPTION OF THE DRAWINGS

Having thus described the disclosure in general terms, reference will now be made to the accompanying drawings, which are not necessarily drawn to scale, and wherein:

DETAILED DESCRIPTION

Illustrative embodiments of the disclosure will now be described more fully hereinafter with reference to the accompanying drawings, in which some but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. Like numbers refer to like elements throughout.

An apparatus for controlling overflows described herein is designed to capture overflow water of at least a single flush (or more) in residential homes, commercial establishments, apartment complexes, and multi-story dwellings and buildings. The overflow water may be captured inside and around a side of a toilet bowl within a gap created by a water outlet fixture. The overflow water from the gap may then be emptied into one or more containers installed from a front side and directly underneath each side of an exterior bowl.

Dimensions and a general rectangular shape of the apparatus for controlling overflows where it attaches to a floor may remain the same as in conventional toilets used today. In addition, installation of the apparatus for controlling overflows, except for the installation of the one or more containers, may remain identical to the installation of conventional toilets used today.

Figure 1:
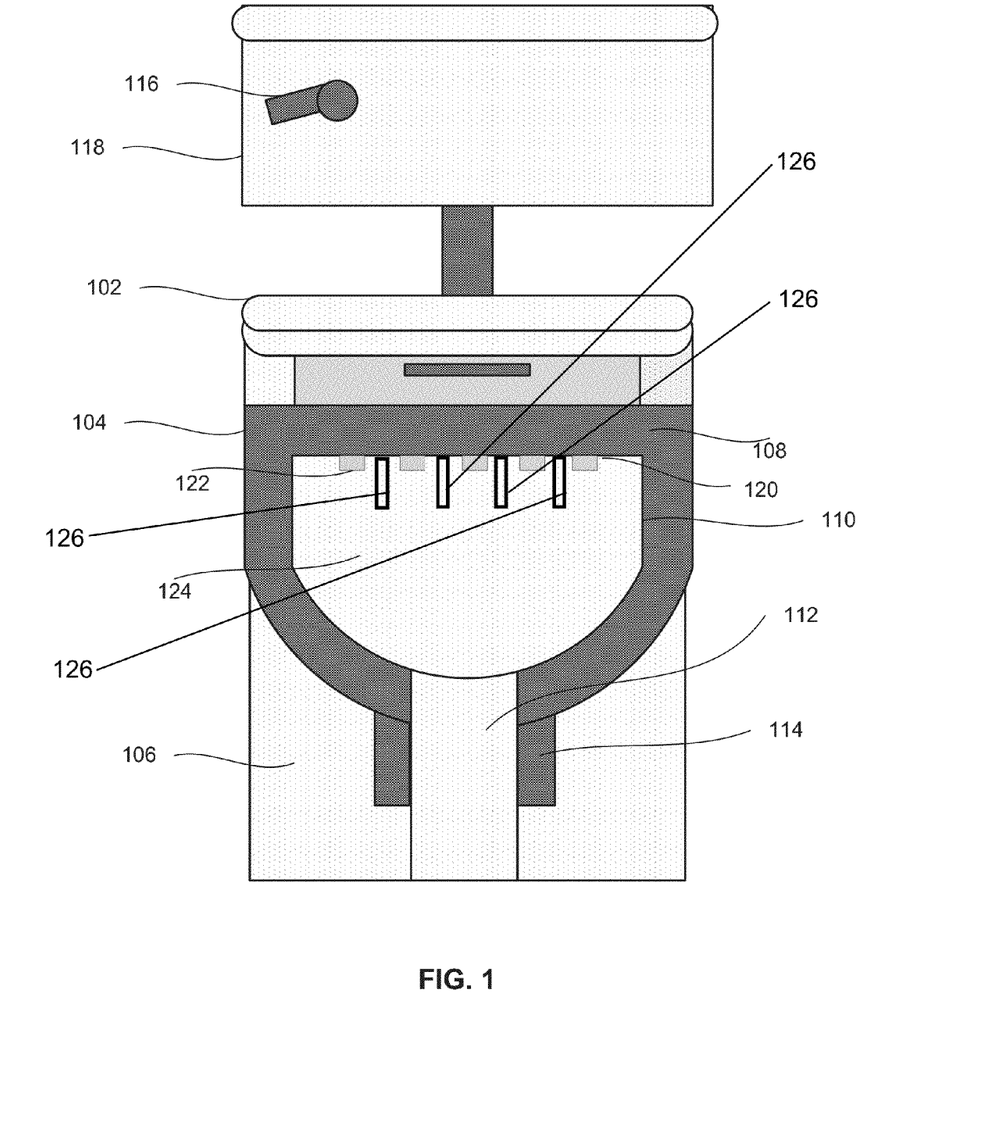
FIG. 1 illustrates a cutaway view of an apparatus for controlling overflows, in accordance with certain embodiments.

Referring now to the figures, FIG. 1 illustrates a cutaway view of an apparatus for controlling overflows, in accordance with certain embodiments. The apparatus for controlling overflows may include several components, such as a water tank 118, a flush handle 116, a closing member 102, an interior bowl 110 including a waste receptacle 124, an exterior bowl 104, a water outlet fixture 120 including one or more water outlets 122, a siphon 112, one or more containers 106, and one or more primary slats 114.

The one or more water outlets 122 may be contained in the interior bowl 110 or directed into the interior bowl 110, and configured to flush the interior bowl 110 through a primary drain.

In certain embodiments, the one or more water outlets 122 may be contained in the water outlet fixture 120 representing an oval shaped, stand-along, hollow, upside down, cone shaped fixture that may be curved inward at its apex. In certain embodiments, the water outlet fixture 120 may be designed to receive overflow water from the interior bowl 110.

In certain embodiments, the one or more water outlets 122 may be located under a rim of the interior bowl 110 and around its outer perimeter. Furthermore, the one or more water outlets 122 may be lowered and moved inward at a predetermined distance. When lowering the one or more water outlets 122 and moving them inward, a gap 108 may be created. The gap 108 may separate the interior bowl 110 and the exterior bowl 104. The gap 108 may be configured to capture overflow water from the interior bowl 110 when the primary drain malfunctions. Furthermore, the one or more water outlets 122 may be provided with the same functionality as water outlets in conventional toilets and may be fed by the same internal flow mechanisms used in the conventional toilets.

In certain embodiments, the rim of the interior bowl 110 may be extended inward at a predetermined distance to conceal the water outlet fixture 120. Extending the rim may also prevent urine from entering the gap 108 during normal use. The rim may be slanted downward into the interior bowl 110, and any waste that may reach it may be emptied into the waste receptacle 124. A circumference of the interior bowl 110 may be increased to accommodate the water outlet fixture 120, increase an area of the gap 108, and conceal the gap 108 and the water outlet fixture 120. When the closing member 102 is lowered, the water outlet fixture 120 and the gap 108 may be completely concealed.

In certain embodiments, the one or more water outlets 122 may be configured to prevent clogs by breaking up solid waste and toilet paper with a jet-like water action. Thus, the one or more water outlets may prevent clogs in the siphon 112 and sewage pipes. Additionally, the one or more water outlets 122 may be disposed towards the lower portion of the water outlet fixture 120 for the same purposes.

In certain embodiments, toward a front side of the interior bowl 110 on both sides, the water outlet fixture 120 may taper upward and underneath a rim of the inside of the exterior bowl 104, thereby preventing urine from getting into the gap 108 during normal use. The rim or the interior bowl 110 may be extended inwards, and an appropriate distance over the one or more water outlets 122 may be created to help conceal the one or more water outlets 122 and prevent waste from entering the gap 108 during normal use.

In certain embodiments, the gap 108 may be designed to rise to a backside of the exterior bowl 104 on each side since the water tank 118 may connect to the water outlet fixture 120 in this general area.

In certain embodiments, the one or more containers 106 further described in detail with reference to FIGS. 2 and 3 may be connected to the gap 108 and may collect the overflow water leaking from the gap 108 through the one or more primary slats 114 coupled to the exterior bowl 104. The one or more primary slats 114 may extend downward at a predetermined distance along a bottom and an outer wall of the exterior bowl 104. Furthermore, an area may be formed between the one or more primary slats 114, and the area may be configured to receive the overflow water captured by the gap 108. In addition, the area between the one or more primary slats 114 on each side of the exterior bowl 104 may be oval-shaped to allow more waste to enter the one or more containers 106.

In certain embodiments, the water tank 118, the exterior bowl 104, and the closing member 102 may be colored or decorated according to a choice a user. The apparatus for controlling overflows, the closing member 102, and the flush handle 116 could be sold at Toys-R-Us. In certain embodiments, the exterior bowl 104, the closing member 102, the water tank 118 may have any decorations affixed or any scenes or patterns painted.

In certain embodiments, the water tank 118 may be also custom designed and sold separately or with the apparatus for controlling overflows. For example, the water tank 118 may be shaped as a shield, gun, sword, or some other shape and may provide the same volume of water and the same size base as conventional water tanks. Modularity of components of the apparatus for controlling overflows may be provided and custom ordered.

In certain embodiment, the flush handle 116 may be colored and sized differently. The flush handle 116 may be made into the shape of a gun, laser, toy, and the like. In order to maintain functionality, the flush handle 116 may have the same basic but not necessarily identical dimensions.

Figure 2:
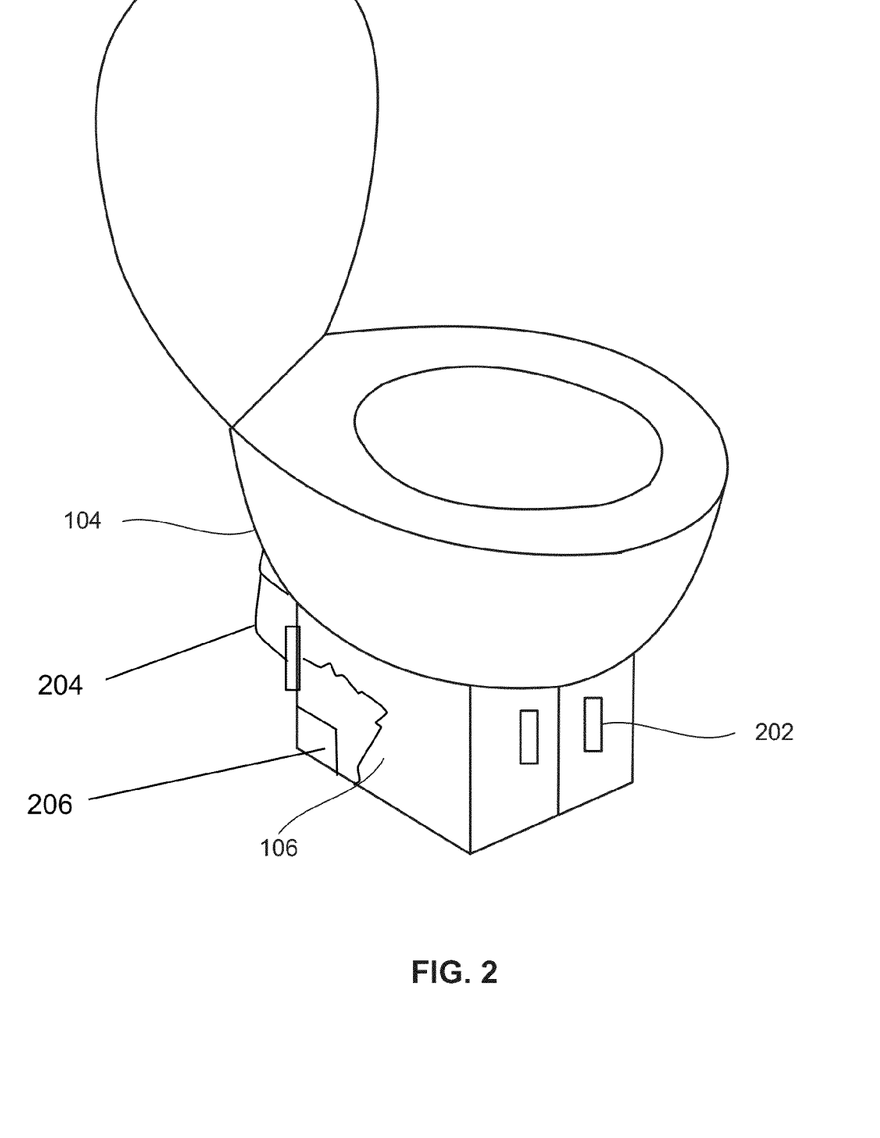
FIG. 2 illustrates an overall view of an apparatus for controlling overflows, in accordance with certain embodiments.

FIG. 2 illustrates an overall view of an apparatus for controlling overflows, in accordance with certain embodiments. The apparatus for controlling overflows may have the one or more containers 106 for collecting overflow water. A size and volume of the one or more containers 106 may be large enough to hold at least a single flush of the overflow water. The one or more containers 106 may be constructed of plastic or another material and may provide structural support for interior bowl 110 and exterior bowl 104. Besides, the one or more containers 106 may be disposed in a front area and around a bottom of the exterior bowl 104 and may be extended backwards to a rear of the exterior bowl 104. However, the one or more containers 106 may not extend to a very back of the exterior bowl 104 because the connection from a water tank to a water outlet fixture may be made in this area.

In certain embodiments, to make the one or more containers 106 appear as integrated parts of the apparatus for controlling overflows, the one or more containers 106 may have the same color as the exterior bowl 104 and may conform to a lower outer shape of the exterior bowl 104.

In certain embodiments, as illustrated in FIG. 2, one or more chlorinated pads 206 may be disposed at a bottom of the one or more containers 106. The one or more chlorinated pads 206 may be configured to reduce odors from the overflow water.

In certain embodiments, the one or more containers 106 may have built-in, recessed handles 202 to easily insert and remove the one or more containers 106.

In certain embodiments, as illustrated in FIG. 2, Velcro straps 204 may be attached to a back area of the one or more containers 106 and the exterior bowl 104 to hold the one or more containers 106 in place.

In certain embodiments, the one or more containers 106 may be connected to sewage containers located underneath and to a side of a water tank to hold an additional overflow. These sewage containers may be connected in a serial configuration between containers of adjacent toilets in individual restrooms and between restrooms of single or multi-story buildings to share sewage capacities.

Figure 3:
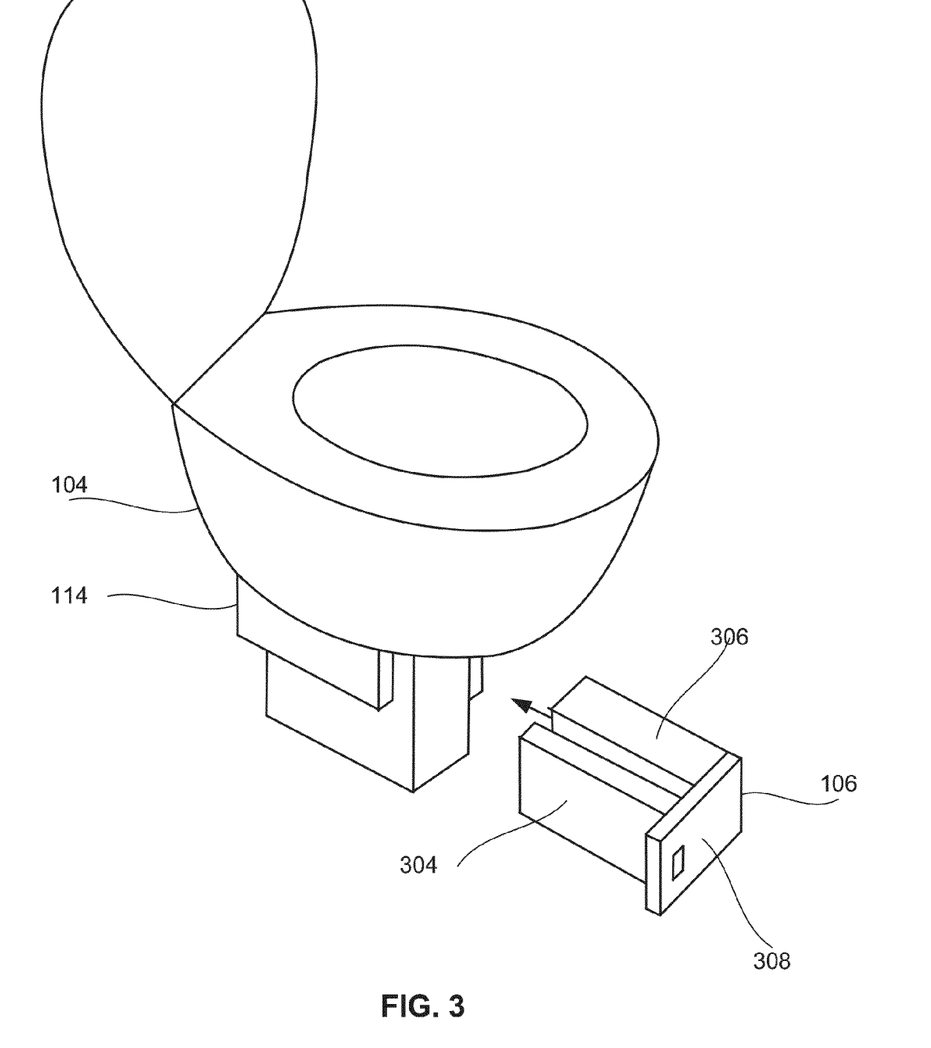
FIG. 3 illustrates an overall view of a container being attached to an apparatus for controlling overflows, in accordance with certain embodiments.

FIG. 3 illustrates an overall view of a container being attached to an apparatus for controlling overflows, in accordance with certain embodiments.

In certain embodiments, one or more inner walls 304 of the one or more containers 106 may have secondary slats or openings mating around the one or more primary slats 114 of the exterior bowl 104.

In certain embodiments, a length of the one or more primary slats 114 on each side of the exterior bowl 104 may be as long as possible and may be limited by a length of the one or more containers 106 and secondary slats mating with the exterior bowl 104. Furthermore, the one or more primary slats 114 may be as high around a bottom of the exterior bowl 104 as possible to allow the most amount of overflow water to be captured. To empty and clean the one or more containers 106, they may be slid backwards. To attach the one or more containers 106 to the exterior bowl 104, they may be slid forward.

In certain embodiments, the one or more containers 106 may have gap openings along a top wall 306 and an outer wall (not shown) to accept the overflow water from sides of a conventional toilet bowl. In certain embodiments, the gap openings may be provided along the top wall 303, the outer wall, and a front wall 308. In this case, the one or more inner walls 304 of the one or more containers 106 may be configured to abut firmly to the exterior bowl 104 to prevent the overflow water from leaking down the one or more inner walls 304 of the one or more containers 106 onto a floor.

In certain embodiments, a coloring scheme of the one or more containers 106 may match a color of the exterior bowl 104 to conceal the gap openings. Furthermore, to conceal the gap openings, the exterior bowl 104 and the one or more containers 106 may be decorated using decals and matching patterns and colors along their edges.

In certain embodiments, the one or more containers 106 may be connected to one or more sewage containers located underneath and to a side of a water tank to hold an additional overflow.

In certain embodiments, in multi-story buildings and commercial buildings with multiple restrooms, the one or more containers 106 of an individual apparatus for controlling overflows or conventional toilets with the one or more containers 106 may be connected between themselves and/or to larger containers located on lower floors and throughout a building or a basement to prevent overflows occurring on upper floors from reaching floors beneath them. This supplementary sewage system may be designed and installed in multi-story buildings during their construction.

In certain embodiments, in single-story businesses and shopping malls with multiple restrooms, the one or more containers 106 may be connected in serial between themselves or to one or more sewage containers behind toilets. These sewage containers may then be connected in serial to share sewage capacity among all the toilets in case of multiple flushes from any number of toilets.

Figure 4:
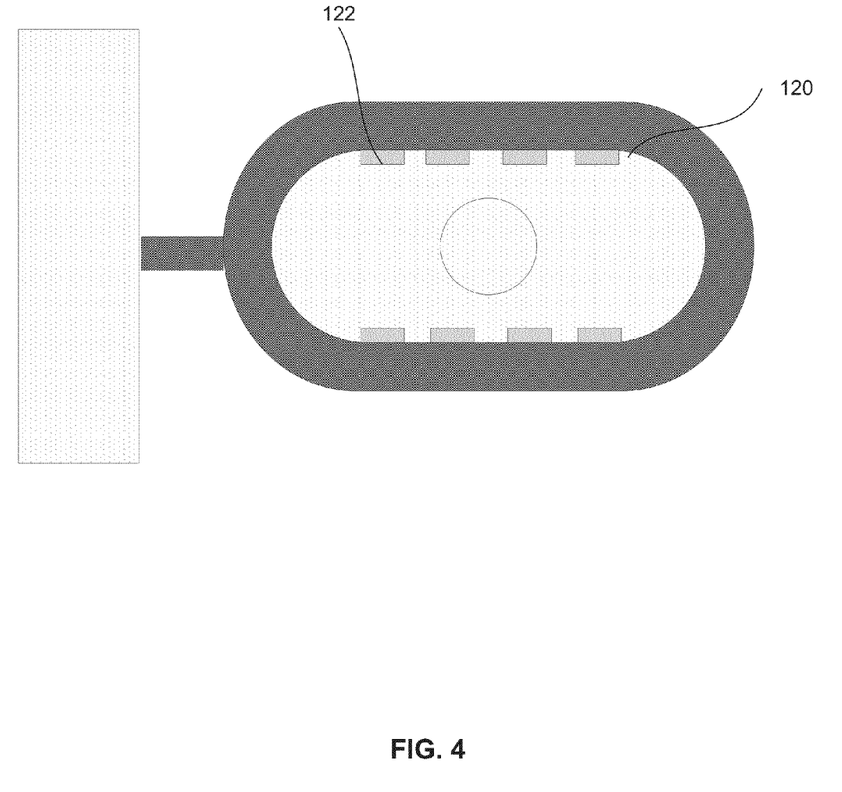
FIG. 4 illustrates a top view of an apparatus for controlling overflows, in accordance with certain embodiments.

FIG. 4 illustrates a top view of an apparatus for controlling overflows, in accordance with certain embodiments.

In certain embodiments, the one or more water outlets 122 may be hinged to provide bidet functionality. These bidet hinges and associated housing in the water outlet fixture 120 may allow them to be user changeable and remain in place when the interior bowl 110 is flushed. A number, size, and shape of the bidet hinges may provide enough water pressure to be directed upwards but not over a closing member further described in detail with reference to FIG. 5. A user may use toilet paper to rotate the bidet hinges upward or back to their original position.

In certain embodiments, as illustrated in FIG. 1, bidet outlets 126 may be designed in an upper area of the water outlet fixture 120 and may be pointing upwards. The bidet outlets 126 may have slidable covers (not shown), which could be opened and closed by the user.

Figure 5:
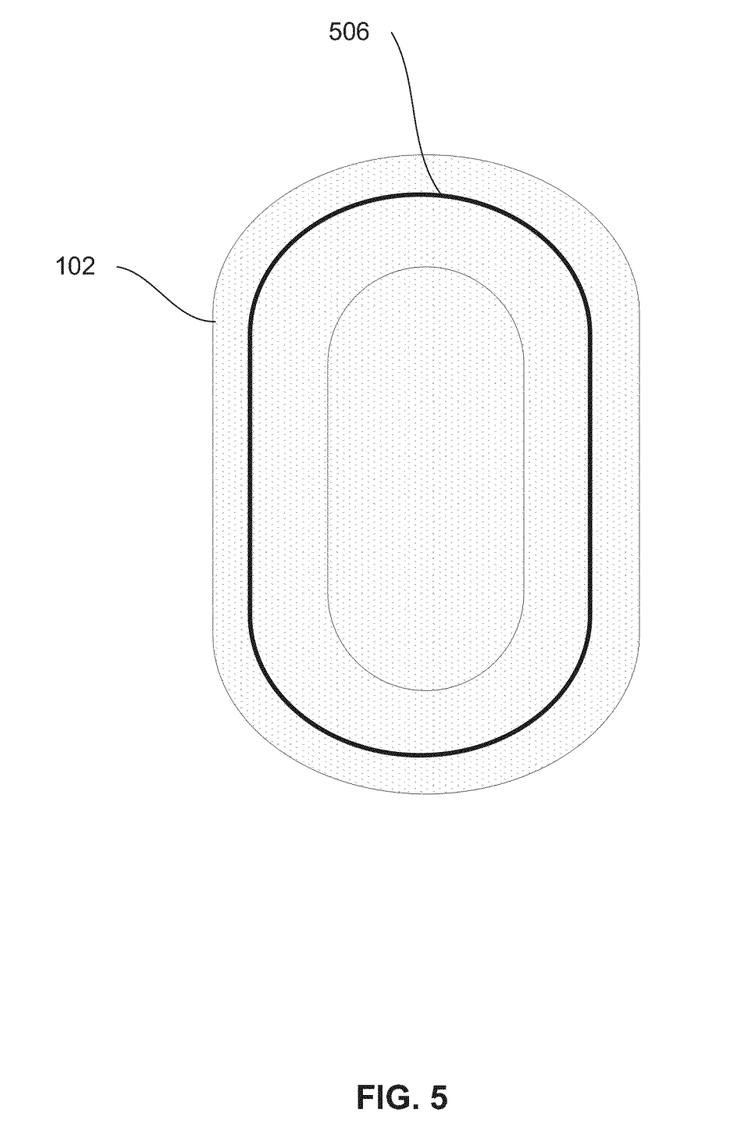
FIG. 5 illustrates a closing member, in accordance with example embodiments.

FIG. 5 illustrates a closing member, in accordance with example embodiments.

The closing member 102 may provide additional overspill protection and may be used with standard toilets. The closing member 102 may include a seat and a lid and may be designed with a barrier ridge 506 underneath and around its entire outer perimeters. The seat of the closing member 102 may have a primary front area and a primary back area. The lid of the closing member 102 may have a secondary front area and a secondary back area.

The closing member 102 may be used with the apparatus for controlling overflows described herein or with a conventional toilet.

When used with the apparatus for controlling overflows, overflow water may be directed back into the interior bowl or into the one or more containers described in detail with reference to FIGS. 2 and 3.

When used with the conventional toilet, the overflow water may be directed back into the interior bowl. In addition, a force exerted by a back pressure of water from the barrier ridge 506 may, depending on severity, remove a clog in a siphon or external sewage pipes.

In certain embodiments, the barrier ridge 506 may hold and prevent any overflows not caught by a gap to spill underneath the closing member 102, over edges of an exterior bowl, and onto a floor, as occurs today. Furthermore, when the closing member 102 is lowered, the overflows may be forced through a gap.

During normal use, the barrier ridge 506 underneath the primary front area of the seat may also prevent urine from inadvertently spilling over the edges of the exterior bowl. Furthermore, when one or more containers are full, a volume of overflows held may be increased by a containment provided by the closing member 102. Later, the overflows may be manually emptied from an interior bowl instead of it spilling onto the floor.

In certain embodiments, since a rim of the interior bowl may be slanted downwards at a predetermined degree and the water outlet fixture toward a front area of an interior bowl may extend upward and underneath a front of the rim on both sides, any urine caught under the seat may spill back into the interior bowl and not into the gap.

In certain embodiments, the barrier ridge 506 underneath the seat may rest on an outside and most level part of the rim. The barrier ridge 506 underneath the lid may also prevent any overflows rising above the seat from spilling over the edges of the exterior bowl and onto the floor. In addition, the user may apply pressure to the lid to force the overflows into the gap, or a weight of the lid may also help do the same.

In certain embodiments, a depth of the barrier ridge 506 may have the same length (or higher) as the pads currently used today.

In certain embodiments, if there is insufficient air pressure in the interior bowl to flush a waste receptacle when the closing member 102 is lowered, gaps in the barrier ridge 506 in the lid may be provided. Since sewage is represented mostly by fluids, the gaps may be designed in the barrier ridge 506 of the seat to allow only fluids to pass and solids to remain in the waste receptacle. Even if the gaps are blocked, the barrier ridge 506 may force overflows into the gap.

In certain embodiments, the seat of the closing member 102 may have one or more primary barrier ridges in the primary front area and the primary back area. Accordingly, the lid of the closing member 102 may have one or more secondary barrier ridges in the secondary front area and the secondary back area. The primary and secondary barrier ridges may be configured to direct the overflows to a bowl. The bowl may include conventional toilet bowl. Furthermore, the barrier ridges of the closing member 102 may be designed with gaps to only allow fluids to escape and force solid waste and toilet paper to remain in the bowl instead of dropping outside the one or more containers. If the gaps were clogged and overflow occurred over the closing member 102, it may still mostly be fluids that may overflow over the edges of the bowl, and these fluids may be collected by the one or more containers.

Figure 6:
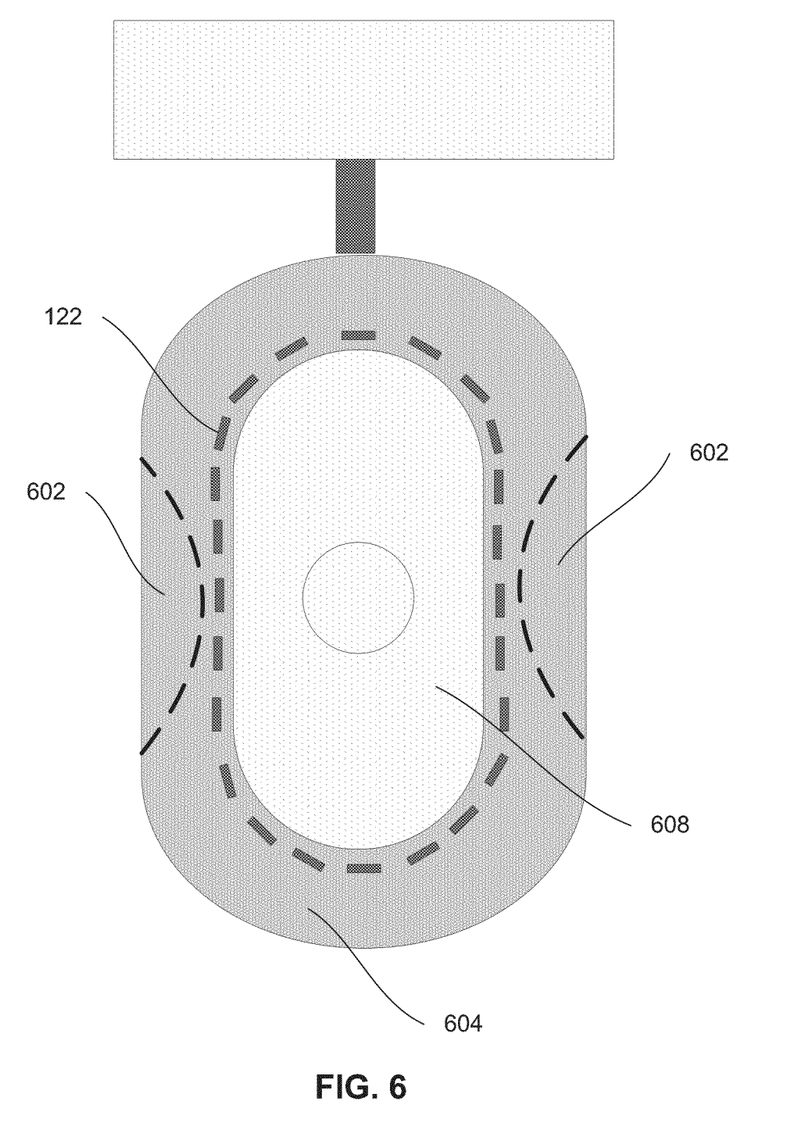
FIG. 6 illustrates a top view of an apparatus for controlling overflows with overflow outlets, in accordance with certain embodiments.

FIG. 6 illustrates a top view of an apparatus for controlling overflows with overflow outlets, in accordance with certain embodiments.

The apparatus for controlling overflows may be configured as a conventional toilet and may have the one or more water outlets 122 disposed around a rim 604. The one or more water outlets 122 may be configured to flush a bowl 608 through a primary drain. In addition, the apparatus for controlling overflows may have overflow outlets 602 on both sides under the rim 604. The overflow outlets 602 may be pushed in and down. When the overflow outlets 602 are pushed down, they may receive overflow water. Specifically, when the water rises in the bowl 608, the water may flow into the overflow outlets 602 and further into containers (not shown) that may be configured to collect the overflow water. The containers may be fixed to the bowl 608 and may fit around the overflow outlets 602. Fixing the containers around the bowl 608 may be performed using various means to ensure a tight abutment to the bowl 608 and to prevent the overflow water from leaking on the floor.

Figure 7:
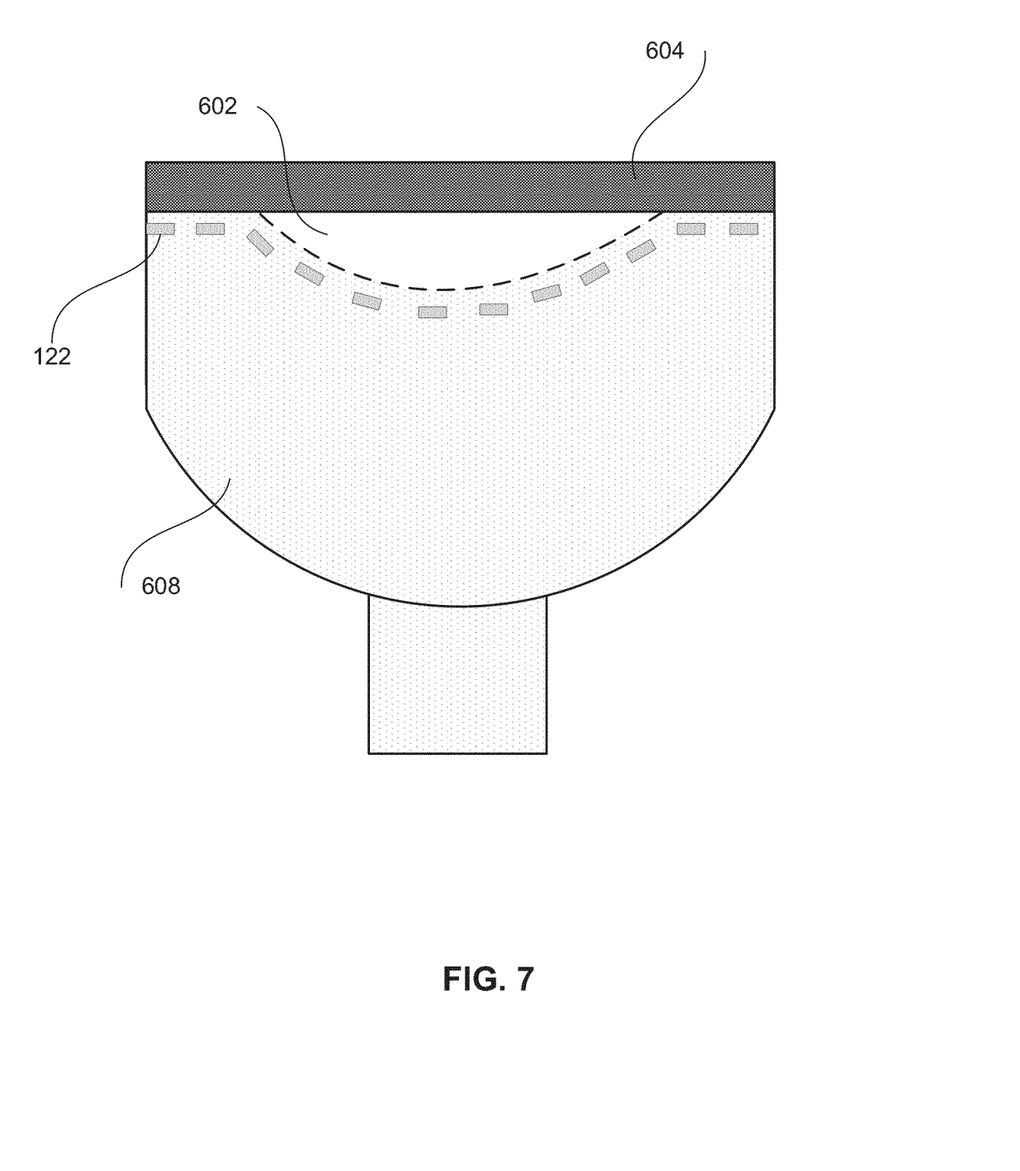
FIG. 7 illustrates a side view of an apparatus for controlling overflows with overflow outlets, in accordance with certain embodiments.

FIG. 7 illustrates a side view of an apparatus for controlling overflows with overflow outlets, in accordance with certain embodiments.

The water outlets 122 may be configured to flush the bowl 608 and may be disposed under the overflow outlets 602. The overflow outlets 602 may be formed between the rim 604 and the bowl 608.

When the water level rises to a certain point in the bowl 608, the overflow water may be captured by the overflow outlets 602 and then collected by containers (not shown) that are fixed to the bowl 608 and fit around the overflow outlets 602 to prevent the overflow water from leaking on the floor.

In certain embodiments, to prevent overflows, a closing member (not shown) including a seat and a lid may be used. The closing member may have a barrier ridge in the front area and in the back area. The barrier ridge may have a space in it and direct the overflow water into the containers fixed on both sides of the bowl 608.

Although the embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. An apparatus for controlling overflows, the apparatus comprising:
    an interior bowl including a waste receptacle and one or more water outlets connected to a water tank, the one or more water outlets configured to flush the interior bowl through a primary drain;
    an exterior bowl surrounding the interior bowl, wherein the interior bowl and the exterior bowl are separated by a gap, the gap configured to capture overflow water from the interior bowl when the primary drain malfunctions; and
    one or more containers connected to the gap, the one or more containers configured to collect the overflow water; wherein the one or more containers have one or more secondary slats on one or more inner walls, and wherein the one or more secondary slats configured to mate around one or more primary slats of the exterior bowl.

2. The apparatus of claim 1, further comprising a closing member having one or more barrier ridges configured to prevent the overflows, the one or more barrier ridges being disposed underneath and around an outer perimeter of the closing member.

3. The apparatus of claim 2, wherein the closing member includes a seat and a lid.

4. The apparatus of claim 2, wherein a force exerted by a back pressure of water from the one or more barrier ridges removes a clog in a siphon or external sewage pipes.

5. The apparatus of claim 1, wherein the one or more water outlets are further configured to prevent clogs by breaking up solid waste and toilet paper with a jet-like water action.

6. The apparatus of claim 1, further comprising a water outlet fixture configured to receive the overflow water from the interior bowl.

7. The apparatus of claim 6, further comprising bidet outlets, the bidet outlets being designed in an upper area of the water outlet fixture.

8. The apparatus of claim 1, wherein an area is formed between the one or more primary slats, the area being configured to receive the overflow water captured by the gap.

9. The apparatus of claim 1, wherein the one or more containers further comprise one or more chlorinated pads, the one or more chlorinated pads being disposed at a bottom of the one or more containers.

10. The apparatus of claim 9, wherein the one or more chlorinated pads are configured to reduce odors from the overflow water.

11. The apparatus of claim 1, wherein the one or more containers have one or more built-in, recessed handles configured to easily insert and remove the one or more containers.

12. The apparatus of claim 1, further comprising hook and loop fastener straps attached to a back area of the one or more containers and the exterior bowl to hold the one or more containers in place.

* * * * *